United States Patent [19]

Naito

[11] Patent Number: 5,237,247
[45] Date of Patent: Aug. 17, 1993

[54] THREE-PHASE SINE WAVE SIGNAL SYNTHESIZING CIRCUIT AND BRUSHLESS MOTOR DRIVE CIRCUIT USING THE SAME

[75] Inventor: Hayato Naito, Komagane, Japan

[73] Assignee: Sankyo Seiki Mfg. Co., Ltd., Nagano, Japan

[21] Appl. No.: 899,960

[22] Filed: Jun. 17, 1992

Related U.S. Application Data

[63] Continuation of Ser. No. 595,436, Oct. 11, 1990, abandoned.

[30] Foreign Application Priority Data

Oct. 17, 1989 [JP] Japan ............................ 1-269524

[51] Int. Cl.$^5$ .............................................. H02P 7/00
[52] U.S. Cl. ...................................... 318/254; 318/439
[58] Field of Search ............... 318/254, 138, 439, 727, 318/800–812

[56] References Cited

U.S. PATENT DOCUMENTS

| 3,775,649 | 11/1973 | Bayer et al. | 318/138 X |
| 4,306,182 | 12/1981 | Curtiss | 318/811 |
| 4,354,145 | 10/1982 | Janssen | 318/254 |
| 4,361,794 | 11/1982 | Kawada et al. | 318/800 |
| 4,626,751 | 12/1986 | Doemen | 318/254 |
| 4,627,752 | 12/1986 | Fujisaki et al. | 318/254 |
| 4,658,190 | 4/1987 | Miyazaki et al. | 318/254 |
| 4,752,725 | 6/1988 | Ominato | 318/807 |

Primary Examiner—Jonathan Wysocki
Attorney, Agent, or Firm—McAulay Fisher Nissen Goldberg & Kiel

[57] ABSTRACT

A three-phase sine wave signal synthesizing circuit comprises a pair of detectors for respectively generating substantially sinusoidal wave output signals having a phase difference of 120° in terms of electric angle upon detecting a two-phase sine wave output generated by a signal generator and a pair of amplifiers for amplifying the output signals from the pair of detectors and transmitting the non-inverted output signals as a first-phase output signal and a second-phase output signal as well as an inverted signal. Terminals for transmitting the inverted signals from the pair of amplifiers are mutually short-circuited and a third-phase, non-inverted output signal is transmitted from the point of the short-circuit. Such circuit does not require a synthesizer to obtain a third-phase output signal and consequently can be significantly simplified to reduce its manufacturing cost. Moreover, such circuit can enhance the accuracy of three-phase sine wave output signals it transmits. A brushless motor drive circuit using a three-phase sine wave signal synthesizing circuit according to the invention can be significantly simplified to reduce its manufacturing cost.

5 Claims, 5 Drawing Sheets

1

THREE-PHASE SINE WAVE SIGNAL SYNTHESIZING CIRCUIT AND BRUSHLESS MOTOR DRIVE CIRCUIT USING THE SAME

This application is a continuation of application Ser. No. 595,436, filed Oct. 11, 1990, now abandoned.

BACKGROUND OF THE INVENTION

1. Field of the Invention

The present invention relates to a three-phase sine wave signal synthesizing circuit and a brushless motor drive circuit using the same 2. Background Prior Art There have been known various three-phase sine wave signal synthesizing circuits to be used for brushless motor circuits including one disclosed in Japanese Patent (Tokkai) No. 60-96191 and illustrated in FIG. 6 of the accompanying drawings. With the three-phase sine wave signal synthesizing circuit of FIG. 6, whenever detectors 1, 2, which are Hall devices, detect a substantially sinusoidal two-phase output generated by a signal generator 3 comprising a rotor magnet of a brushless motor, they, in turn, generate substantially sinusoidal two-phase output signals Ain and Bin having a phase difference of 120° from each other in terms of electric angle. These output signals Ain and Bin are amplified by amplifiers 4 and 5 and provided respectively as a first-phase output signal Aout and a second-phase output signal Bout. The output signals from the amplifiers 4 and 5 are then added and inverted by a synthesizer 8 comprising an adder 6 and an inverter 7 to produce a third-phase output signal Cout, the first-phase output signal Aout from the amplifier 4, the second-phase output signal Bout from the amplifier 5 and the third-phase output signal Cout from the synthesizer 8 having a phase difference of 120° from one another.

Since a three-phase sine wave signal synthesizing circuit as described above uses a synthesizer 8 for producing a third-phase output signal, the overall circuit configuration inevitably becomes a complicated one, which in turn raises the manufacturing cost, and the accuracy of output signals of the circuit can be relatively poor because of errors involved in substantially sinusoidal three-phase output signals Aout, Bout and Cout.

A high cost of a three-phase sine wave signal synthesizing circuit having a relatively complicated configuration as described above results as a matter of course in a high manufacturing cost of a brushless motor driving circuit using such a synthesizing circuit. Moreover, the poor accuracy of substantially sinusoidal three-phase output signals Aout, Bout and Cout due to the use of a synthesizer 8 results in an uneven torque of the brushless motor.

It is therefore an object of the present invention to provide a three-phase sine wave signal synthesizing circuit which is free from the above disadvantage and has a simplified circuit configuration, requiring a reduced manufacturing cost, and a brushless motor drive circuit using such a three-phase sine wave signal synthesizing circuit.

SUMMARY OF THE INVENTION

According to an aspect of the invention, the above object is achieved by providing a three-phase sine wave signal synthesizing circuit comprising means for generating a pair of substantially sinusoidal wave signals having a phase difference of 120° in terms of electrical angle, first amplifying means responsive to one of the signals for amplifying that signal to provide a non-inverted output signal as a first-phase output signal and an inverted first output signal, second amplifying means responsive to the other of the signals for amplifying the other signal to provide a non-inverted output signal as a second-phase output signal and an inverted second output signal and means for connecting the inverted first and second output signals by a short circuit to provide a third-phase, output signal at the point of the short circuit.

In a particular form of the invention, the means for generating the pair of substantially sinusoidal wave signals includes a pair of detector means, the pair of detector means responsive to a signal from a signal generator.

According to another aspect of the invention, there is provided a brushless motor drive circuit comprising a rotor magnet substantially sinusoidally magnetized in the sense of rotation, a three-phase drive coil for causing the rotor magnet to rotate, a pair of detectors for detecting the rotary position of the rotor magnet and generating substantially sinusoidal output signals having a phase difference of 120° in terms of electric angle, means for generating a pair of substantially sinusoidal wave signals having a phase difference of 120° in terms of electrical angle, first amplifying means responsive to one of the signals for amplifying that signal to provide a non-inverted output signal as a first-phase output signal and an inverted first output signal, second amplifying means responsive to the other of the signals for amplifying the other signal to provide a non-inverted output signal as a second-phase output signal and an inverted second output signal and means for connecting the inverted first and second output signals by a short circuit to provide a third-phase, non-inverted output signal at the point of the short circuit.

A preferred embodiment of the brushless motor drive circuit of the invention further comprises a three-phase sine wave current supply circuit for supplying a substantially sinusoidal three-phase current to the three-phase drive coil in response to the first-phase, second-phase and third-phase output signals.

With a three-phase sine wave signal synthesizing circuit according to the invention as described above, the pair of detectors respectively generate substantially sinusoidal wave output signals having a phase difference of 120° in terms of electric angle upon detecting a two-phase sine wave output generated by a signal generator and the pair of amplifiers amplify the output signals from the pair of detectors and transmit the non-inverted output signals as a first-phase output signal and a second-phase output signal as well as an inverted signal. A third-phase output signal is transmitted from a short-circuit point where terminals for transmitting inverted signals from the pair of amplifiers are mutually short-circuited.

With a brushless motor drive circuit according to the invention, a rotor magnet is caused to rotate by a three-phase drive coil and a pair of detectors detect the rotary position of rotor magnet and generate substantially sinusoidal output signals having a phase difference of 120° in terms of electric angle. Further, a pair of amplifiers amplify the respective output signals of the pair of detectors and transmit the non-inverted signals as a first-phase output signal and a second-phase output signal as well as an inverted output signal. Terminals for transmitting the inverted signals from the pair of amplifiers are mutually short-circuited and a third-phase output signal is transmitted from the point of short-circuit.

A preferred embodiment of the brushless motor drive circuit of the invention further comprises a three-phase sine wave current supply circuit that supplies a substantially sinusoidal three-phase current to the three-phase drive coil in response to the first-phase, second-phase and third-phase output signals.

For a better understanding of the present invention, reference is made to the following description and accompanying drawings while the scope of the invention will be pointed out in the appended claims.

DESCRIPTION OF THE PREFERRED EMBODIMENTS

Figure 1:
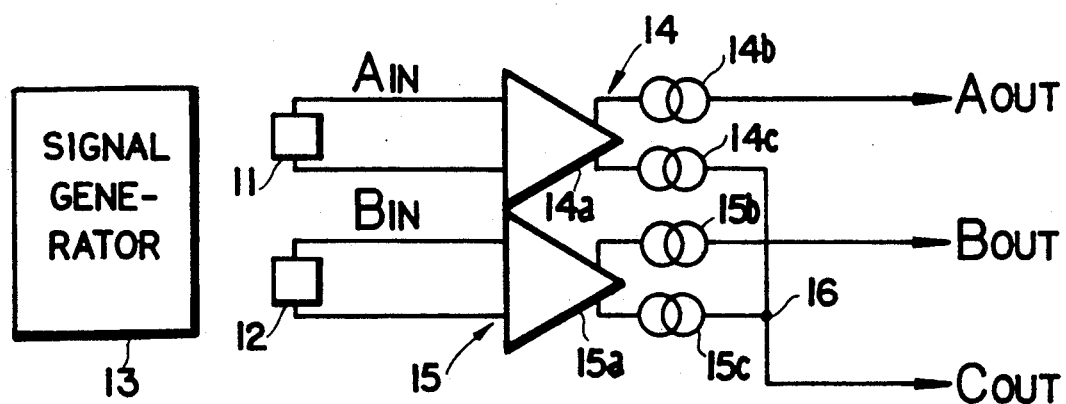
FIG. 1 is a block diagram of a first embodiment of the three-phase sine wave signal synthesizing circuit of the invention.

Referring firstly to FIG. 1 illustrating a first embodiment of the three-phase sine wave signal synthesizing circuit of the invention, detectors 11 and 12, which are Hall devices, detect a substantially sinusoidal two-phase output generated by a signal generator 13 comprising a rotor magnet which is magnetized to generate a substantially sinusoidal magnetic field in the sense of rotation of a brushless motor and generates substantially sinusoidal two-phase output signals Ain and Bin having a phase difference of 120° in terms of electric angle. These two-phase signals Ain and Bin are then respectively amplified by amplifiers 14 and 15. The amplifiers 14 and 15 respectively comprise main bodies 14a and 15a, non-inverted current output sections 14b and 15b and inverted current output sections 14c and 15c. Substantially sinusoidal two-phase output signals Ain and Bin from the two detectors 11 and 12 are respectively amplified by the main bodies 14a and 15a and transmitted from the non-inverted current output sections 14b and 15b as a first-phase non-inverted current output signal Aout and a second-phase non-inverted current output signal Bout, while they are also transmitted from the inverted current output sections 14c and 15c as a first-phase inverted current signal $\overline{Aout}$ and a second-phase inverted current signal $\overline{Bout}$. The output terminals of the inverted current output sections 14c and 15c of the amplifiers 14 and 15 are short-circuited (i.e., connected) and the first-phase inverted current signal $\overline{Aout}$ and the second-phase inverted current signal $\overline{Bout}$ are added at the point of short-circuit, a signal of the sum being transmitted as a third-phase non-inverted current signal Cout.

Figure 2:
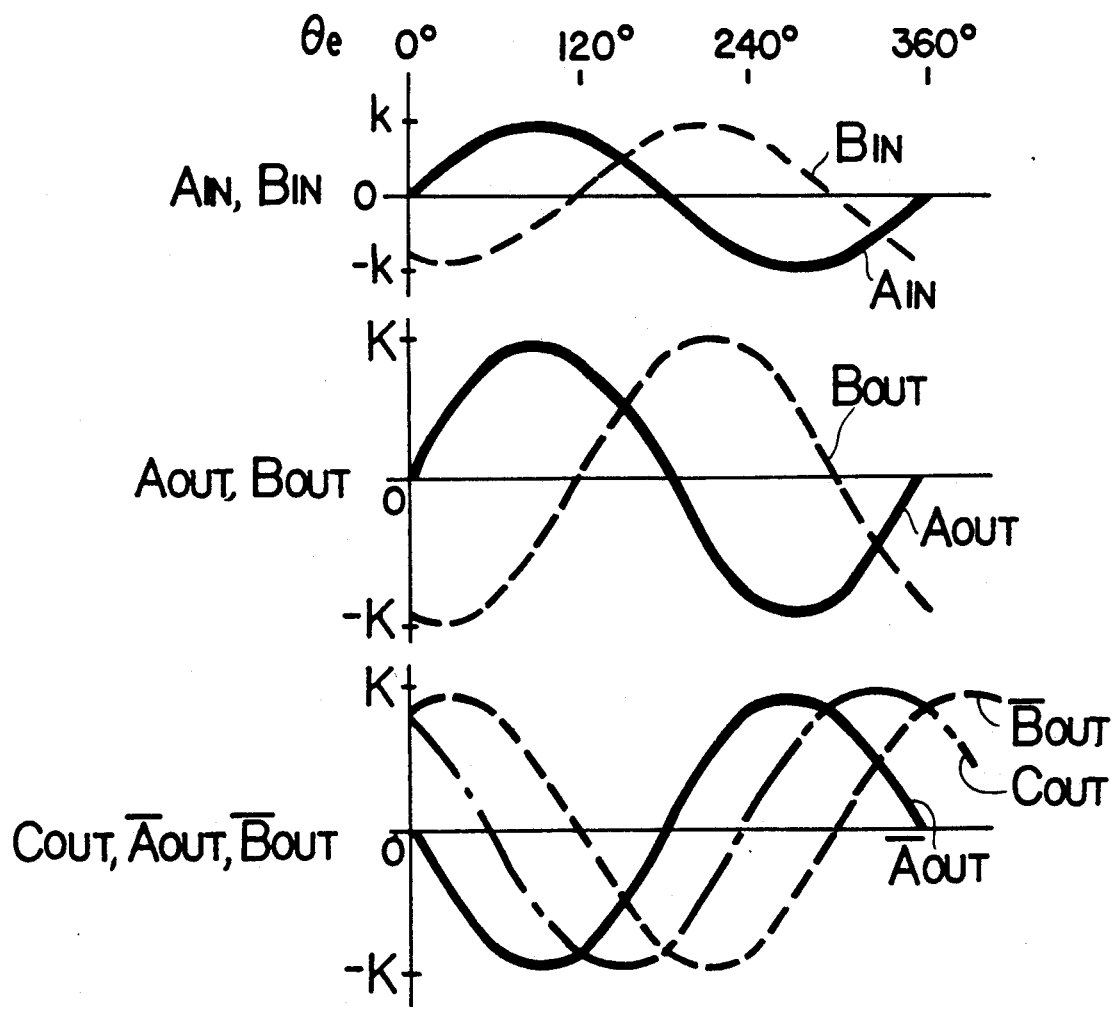
FIG. 2 is a graph showing the waveform of each type of signal of the embodiment of FIG. 1.

The substantially sinusoidal two-phase output signals Ain and Bin have a phase difference of 120° in terms of electric angle. If, now it is assumed that they are sine wave voltage signals as illustrated in FIG. 2 and respectively expressed by Ain=ksinΘe and Bout=Ksin(Θe−120°), the first-phase non-inverted current signal Aout and the second-phase non-inverted current signal Bout are sine wave current signals having a phase difference of 120° in terms of electric angle as illustrated in FIG. 2 and expressed respectively by Aout=KsinΘe and Bout=Ksin(Θe−120°), where k and K are proportional constants. The third-phase non-inverted current signal Cout is formed by adding the first-phase inverted current signal $\overline{Aout}$ and the second-phase inverted current signal $\overline{Bout}$ or $$\begin{aligned} Cout &= \overline{Aout} + \overline{Bout} \\ &= -K\{\sin\Theta e + \sin(\Theta e - 120°)\} \\ &= K\sin(\Theta e - 240°) \end{aligned}$$

which is graphically expressed as a wave as illustrated in FIG. 2.

Figure 3:
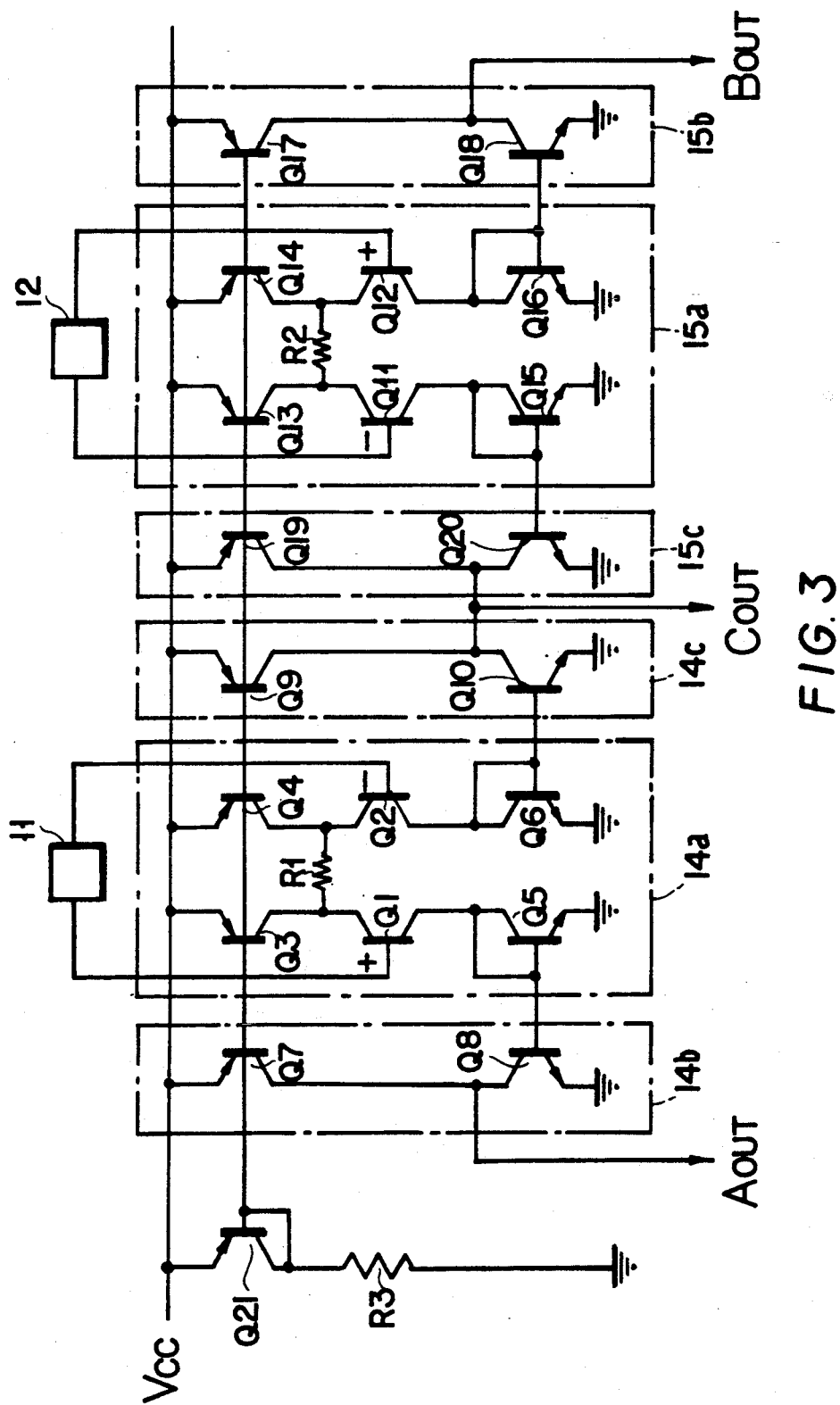
FIG. 3 is a circuit diagram of the amplifiers of the first embodiment.

FIG. 3 shows the configuration of amplifiers 14 and 15.

The main body 14a of the amplifier 14 comprises PNP-type transistors Q1 through Q4, NPN-type transistors Q5 and Q6 and a resistor R1 and amplifies the output signal Ain from the detector 11. The non-inverted current output section 14b of the amplifier 14 comprises a PNP-type transistor Q7 and a NPN-type transistor Q8 and transmits the non-inverted current signal from the main body 14a as a first-phase non-inverted current signal Aout. The non-inverted current output section 14c comprises a PNP-type transistor Q9 and a NPN-type transistor Q10 and transmits the inverted current signal from the main body 14a as a first-phase inverted current signal $\overline{Aout}$.

On the other hand, the main body 15a of the amplifier 15 comprises PNP-type transistors Q11 through Q14, NPN-type transistors Q15 and Q16 and a resistor R2 and amplifies the output signal Bin from the detector 12. The non-inverted current output section 15b of the amplifier 15 comprises a PNP-type transistor Q17 and a NPN-type transistor Q18 and transmits the non-inverted current signal from the main body 15a as a second-phase non-inverted current signal Bout. The non-inverted current output section 15c comprises a PNP-type transistor Q19 and an NPN-type transistor Q20 and transmits the inverted current signal from the main body 15a as a second-phase inverted current signal $\overline{Bout}$.

A substantially sinusoidal third-phase output signal Cout is formed by short-circuiting the inverted current signals $\overline{Aout}$ and $\overline{Bout}$.

PNP-type transistor 21 and a resistor R3 constitute a constant current circuit and applies a constant voltage to the bases of the PNP-type transistors Q3, Q4, Q7, Q9, Q13, Q14, Q17 and Q19.

Figure 4:
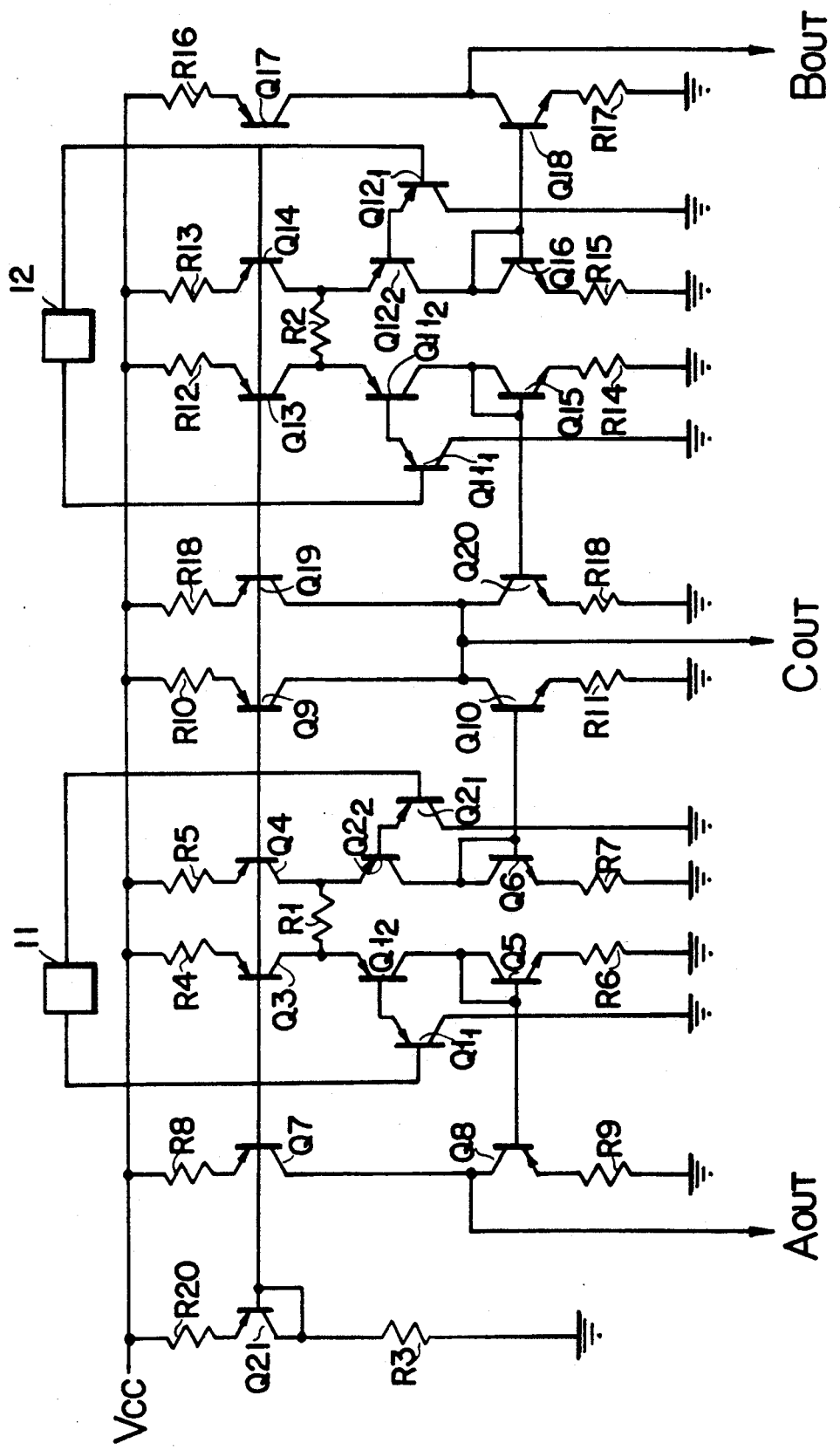
FIG. 4 is a circuit diagram of the amplifiers of a second embodiment of the three-phase sine wave signal synthesizing circuit of the invention.

FIG. 4 illustrates the configuration of an amplifier of a second embodiment of the three-phase sine wave signal synthesizing circuit of the invention.

In this embodiment, the amplifiers 14 and 15 of the first embodiment are replaced by the amplifier of FIG. 4. This amplifier additionally comprises emitter resistors R4 through R20 which are added to the transistors Q3 through Q10 and Q13 through Q21 that respectively constitute the power source side and grounding side Miller circuits and Darlington connection PNP-type transistors $Q1_1$, $Q2_1$, $Q11_1$, $Q12_1$, $Q1_2$, $Q2_2$, $Q11_2$ and $Q12_2$ which replace the PNP-type transistors Q1, Q2, Q11 and Q12 for differential amplification with a view to eliminating any influence of the transistors Q1, Q2, Q11 and Q12.

It should be noted that a three-phase sine wave signal synthesizing circuit having a configuration as described above by referring to the second embodiment finds applications other than a brushless motor drive circuit.

Figure 5:
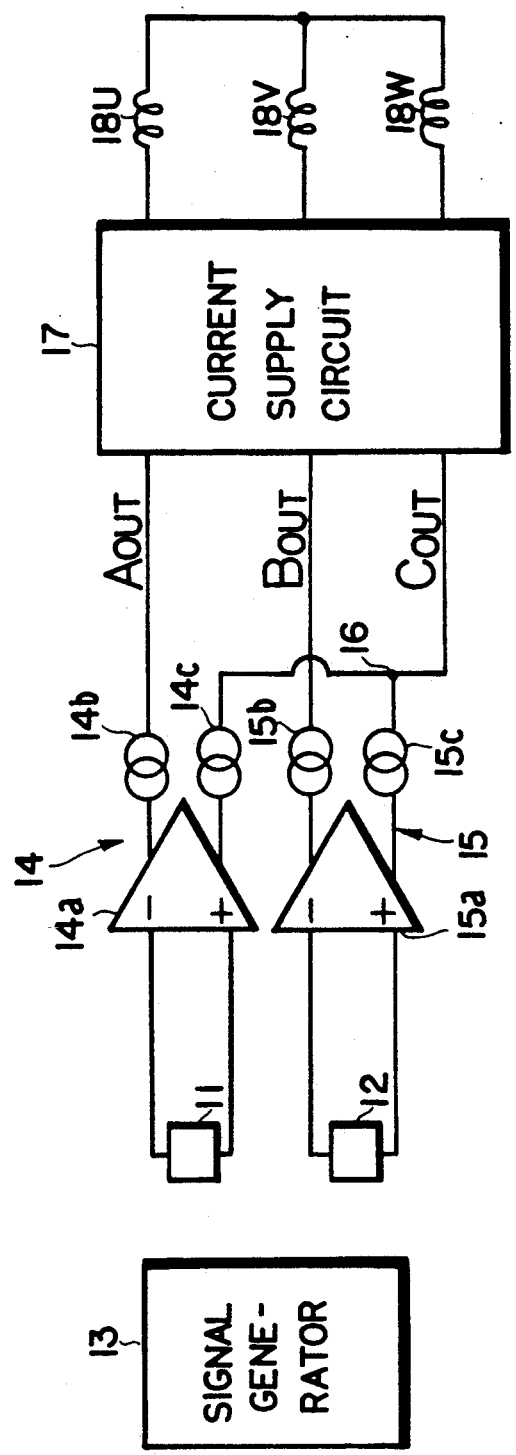
FIG. 5 is a block diagram of an embodiment of the brushless motor drive circuit of the invention.
Figure 6:
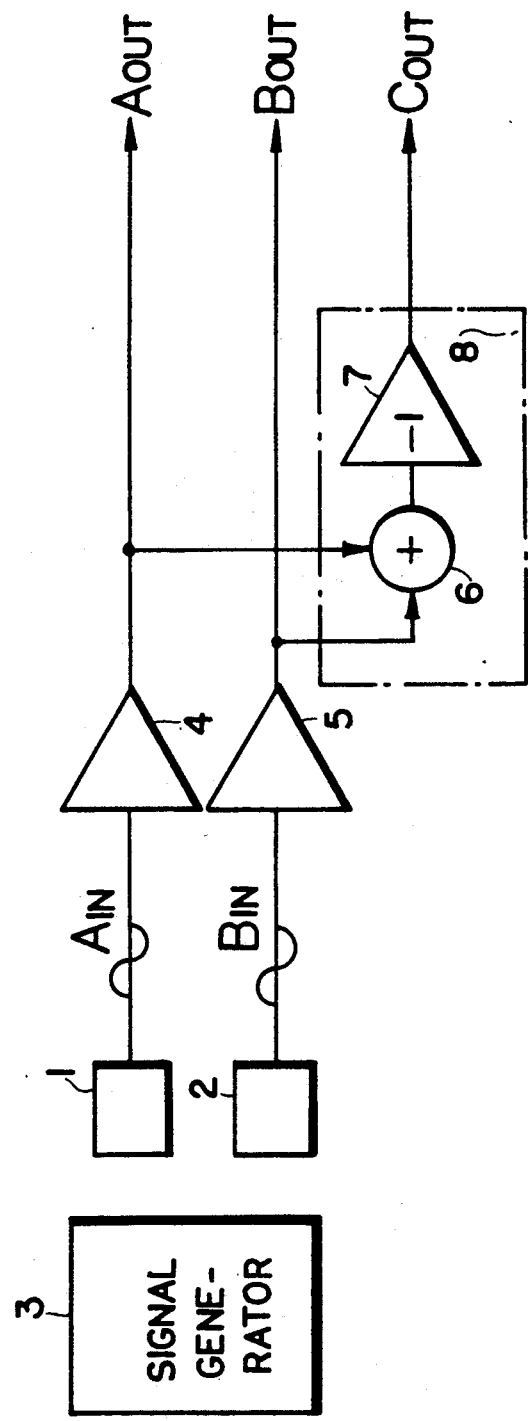
FIG. 6 is a block diagram of a conventional three-phase sine wave signal synthesizing circuit.

FIG. 5 illustrates an embodiment of the brushless motor drive circuit of the invention.

This embodiment is a brushless motor drive circuit of three-phase sine wave current supply type using a three-phase sine wave signal synthesizing circuit as described above and comprises a three-phase sine wave current supply circuit 17 which is identical with the three-phase sine wave current supply circuit used in the brushless motor drive circuit disclosed in Japanese Patent (Tokkai) No. 60-96191 as cited above. This three-phase sine wave current supply circuit receives the first-phase non-inverted current signal Aout and the second-phase non-inverted current signal Bout coming respectively from the non-inverted current output sections 14a and 15b of the amplifiers 14 and 15 as well as the third-phase non-inverted current signal Cout from the point of short-circuit 16 and supplies a substantially sinusoidal three-phase sine wave current to three-phase drive coils 18U, 18V and 18W for driving so that signal generator 13 comprising a rotor magnet is caused to rotate by the three-phase drive coils 18U, 8V and 18W.

Alternatively, the three-phase sine wave current supply circuit may be replaced by a three-phase current supply switching circuit to form a three-phase current supply switching type brushless motor drive circuit. Such a three-phase current supply switching circuit sequentially switches the electric supply to the three-phase drive coils 18U, 18V and 18W in response to substantially sinusoidal three-phase output signals Aout, Bout and Cout, which are received by the circuit respectively as a first-phase non-inverted current signal Aout, a second-phase non-inverted current signal Bout and a third-phase non-inverted current signal Cout respectively coming from the non-inverted current output sections 14b and 15b of the amplifiers 14 and 15 and the point of the short-circuit 16.

As described above, a three-phase sine wave signal synthesizing circuit according to the invention comprises a pair of detectors for respectively generating substantially sinusoidal wave output signals having a phase difference of 120° in terms of electric angle upon detecting a two-phase sine wave output generated by a signal generator and a pair of amplifiers for amplifying the output signals from the pair of detectors and transmitting the non-inverted output signals as a first-phase output signal and a second-phase output signal as well as an inverted signal. Terminals for transmitting the inverted signals from the pair of amplifiers are mutually short-circuited and a third-phase non-inverted output signal is transmitted from the point of short-circuit. Therefore, such a circuit does not require a synthesizer to obtain a third-phase output signal and consequently can be significantly simplified to reduce its manufacturing cost. Moreover, such a circuit can enhance the accuracy of three-phase sine wave output signals it transmits.

A brushless motor drive circuit according to the invention comprises a rotor magnet substantially sinusoidally magnetized in the sense of rotation, a three-phase drive coil for causing the rotor magnet to rotate, a pair of detectors for detecting the rotary position of said rotor magnet and generating substantially sinusoidal output signals having a phase difference of 120° in terms of electric angle and a pair of amplifiers for amplifying the respective output signals of the pair of detectors and transmitting the non-inverted signals as a first-phase output signal and a second-phase output signal as well as an inverted output signal. Terminals for transmitting the inverted signals from the pair of amplifiers are mutually short-circuited and a third-phase non-inverted output signal is transmitted from the point of short-circuit. Therefore again, such a circuit does not require a synthesizer to obtain a third-phase output signal and consequently can be significantly simplified to reduce its manufacturing cost. Moreover, such a circuit can enhance the accuracy of substantially sinusoidal three-phase output signals it transmits and can improve the unevenness of the torque of the brushless motor.

A preferred embodiment of the brushless motor drive circuit of the invention further comprises a three-phase sine wave current supply circuit for supplying a substantially sinusoidal three-phase current to said three-phase drive coil upon receiving said first-phase, second-phase and third-phase output signals. Such an embodiment can further reduce its manufacturing cost and at the same time enhance the accuracy of substantially sinusoidal three-phase output signals it transmits. Moreover, it can improve the unevenness of the torque of the brushless motor.

While the foregoing description and drawings represent the preferred embodiments of the present invention, it will be obvious to those skilled in the art that various changes and modifications may be made therein without departing from the true spirit and scope of the present invention.

What is claimed is:

1. A three-phase sine wave signal synthesizing circuit comprising:
    means for generating a pair of substantially sinusoidal wave signals having a phase difference of 120° in terms of electrical angle;
    first amplifying means responsive to one of said signals for amplifying said one signal so as to provide a non-inverted output signal as a first-phase output signal and an inverted first output signal;
    second amplifying means responsive to the other of said signals for amplifying said other signal so as to provide a non-inverted output signal as a second-phase output signal and an inverted second output signal; and
    means for connecting said inverted first and second output signals by a short circuit so as to provide a third-phase output signal at the point of said short circuit.

2. A three-phase sine wave signal synthesizing circuit as in claim 1 wherein said means for generating said pair of substantially sinusoidal wave signals includes a pair of detector means, said pair of detector means responsive to a signal from a signal generator.

3. A brushless motor drive circuit comprising:
    a rotor magnet substantially sinusoidally magnetized in the sense of rotation;
    a three-phase drive coil for causing said rotor magnet to rotate;
    a pair of detectors for detecting the rotary position of said rotor magnet and for generating substantially sinusoidal output signals having a phase difference of 120° in terms of electrical angle;

first amplifying means responsive to one if said signals for amplifying said one signal so as to provide a non-inverted output signal as a first-phase output signal and an inverted first output signal;

second amplifying means responsive to the other of said signals for amplifying said other signal so as to provide a non-inverted output signal as a second-phase output signal and an inverted second output signal; and means for connecting said inverted first and second output signals by a short circuit so as to provide a third-phase output signal at the point of said short circuit.

4. A brushless motor drive circuit according to claim 3, which further includes a three-phase sine wave current supply circuit for supplying a substantially sinusoidal three-phase current to a three-phase drive coil in response to said first-phase, second-phase and third-phase output signals.

5. A three phase sine wave signal synthesizing circuit comprising:

means for generating a first substantially sinusoidal wave signal;

means for generating a second substantially sinusoidal wave signal, said second signal and said first signal having a phase difference of 120° in terms of electrical angle;

first amplifying means responsive to said first signal for amplifying said signal so as to provide a non-inverted output signal, relative to said first signal, as a first phase output signal and an inverted first output signal;

second amplifying means responsive to said second signal for amplifying said second signal so as to provide a non-inverted output signal, relative to said second signal, as a second-phase output signal and an inverted second output signal; and means for connecting said inverted first and second output signals by a short circuit so as to provide a third phase output signal at the point of said short circuit.

* * * * *